United States Patent [19]

Shibata et al.

[11] Patent Number: 5,657,172
[45] Date of Patent: Aug. 12, 1997

[54] OBJECTIVE LENS DRIVING DEVICE

[75] Inventors: Keiichi Shibata; Koji Mitsumori; Takamichi Tomiyama, all of Chiba, Japan

[73] Assignee: Sony Corporation, Japan

[21] Appl. No.: 557,814

[22] Filed: Nov. 14, 1995

[30] Foreign Application Priority Data

Nov. 18, 1994 [JP] Japan .................................. 6-309680

[51] Int. Cl.⁶ ...................................................... G02B 7/02
[52] U.S. Cl. ..................... 359/824; 359/814; 369/44.15; 310/27; 310/36; 360/106
[58] Field of Search ..................... 359/814, 824; 369/44.15, 44.16; 310/27, 36, 190, 223; 360/106

[56] References Cited

U.S. PATENT DOCUMENTS

| 4,835,643 | 5/1989 | Schulze ..................................... 310/27 |
| 5,018,836 | 5/1991 | Noda et al. ............................. 359/814 |
| 5,046,820 | 9/1991 | Saekusa et al. ........................ 359/814 |
| 5,119,253 | 6/1992 | Kotani ..................................... 360/106 |
| 5,313,334 | 5/1994 | Tomiyama et al. ..................... 359/824 |
| 5,521,762 | 5/1996 | Tomiyama et al. ..................... 359/814 |

FOREIGN PATENT DOCUMENTS

| 0541162 | 5/1993 | European Pat. Off. . |
| 0562646 | 9/1993 | European Pat. Off. . |
| 0561420 | 9/1993 | European Pat. Off. . |
| 0 660 312 A1 | 6/1995 | European Pat. Off. . |

*Primary Examiner*—Loha Ben
*Attorney, Agent, or Firm*—Ronald P. Kananen

[57] ABSTRACT

An objective lens driving device used in an optical recording and/or reproduction apparatus comprises a lens holder, elastic supporting members, a coil bobbin and a yoke. An objective lens is mounted in the lens holder. The elastic supporting members have one end attached to the lens holder and the other end attached to a mounting part. The elastic supporting members support the lens holder movably in a direction parallel to the optical axis of the objective lens and in a plane perpendicular to the optical axis. A coil for focusing and coils for tracking are wound on the coil bobbin. A magnet is mounted on the yoke, and the width of this magnet is selected so that flux from the magnet acts only on effective portions of the coils for tracking.

15 Claims, 7 Drawing Sheets

OBJECTIVE LENS DRIVING DEVICE

BACKGROUND OF THE INVENTION

This invention relates to an electromagnetically driven actuator for an optical pickup used for recording signals to and reproducing signals from an optical recording medium such as an optical disc or an optomagnetic disc.

Conventionally, information signals are reproduced from and recorded to an information recording medium such as an optical disc, for example a so-called compact disc (CD) or an optomagnetic disc, by using an optical pickup. The optical pickup comprises a semiconductor laser as a light source, an objective lens, an optical system and a light detector.

In an optical pickup, a light beam emitted by the semiconductor laser is focused through the optical system onto a recording surface of an optical disc by the objective lens. A returning light beam reflected by the optical disc is split from the light beam emitted by the semiconductor laser and guided to the light detector by the optical system.

The position of the objective lens in the direction of its optical axis is adjusted by an actuator which will be further discussed later so that the light beam emitted from the semiconductor laser follows displacements of the optical disc in a direction orthogonal to the optical disc surface caused by warping and the like of the optical disc and is always focused on the recording surface of the optical disc. At the same time, the position of the objective lens in a direction orthogonal to the optical axis of the objective lens is adjusted by the actuator so that the position of a spot formed on the optical disc by the light beam emitted from the semiconductor laser follows eccentricity of the optical disc and snaking of a track formed on the optical disc.

This adjustment of the focus position and the spot position of the light beam emitted from the semiconductor laser on the recording surface of the optical disc is carried out by adjusting the position of the objective lens in the optical axis direction of the objective lens and the position of the objective lens in the direction perpendicular to this optical axis. An electromagnetically driven actuator is used for this positional adjustment of the objective lens.

This actuator is generally called an objective lens actuator or a biaxial actuator, and typically comprises a lens holder in which the objective lens is mounted, a plurality of elastic supporting members, and a driving part for creating driving forces. The lens holder is supported on a mounting part by the plurality of elastic supporting members so that the position of the objective lens in the direction of the optical axis thereof, that is, the focus position, and the position of the objective lens in a direction orthogonal to the optical axis, that is, the tracking position, are adjustable. An example of this kind of biaxial actuator will be described below with reference to FIG. 1.

The biaxial actuator such as being described above is constructed for example as shown in FIG. 1. In FIG. 1, a biaxial actuator 1 has a lens holder 2 in a front end of which is mounted an objective lens 2a, and a coil bobbin 3 attached by means of adhesive or the like to this lens holder 2.

The lens holder 2 is supported movably with respect to a mounting part 4 in two directions perpendicular to each other, that is, a tracking direction shown by the mark Trk and a focusing direction shown by the mark Fcs, by two pairs of elastic supporting members 5 each having one end fixed to a side of this lens holder 2 and the other end fixed to a mounting part 4.

The coil bobbin 3 is constructed as shown schematically in FIG. 2. That is, the coil bobbin 3 has an opening 3a passing therethrough in the focusing direction and has a focusing coil 3b wound around this opening 3a and two tracking coils 3c located at left and right on the front side of this focusing coil 3b.

By introducing currents into the coils 3b and 3c, magnetic flux produced by the coils 3b and 3c interacts with magnetic flux from an inner yoke 6a and a facing yoke 6b of a yoke 6 mounted on the mounting part 4 and magnets 7a and 7b mounted on the inner yoke 6a and the facing yoke 6b. Currents flowing through the inner parts of the tracking coils 3c extending vertically to the paper surface create a force causing the lens holder 2 to move in the tracking direction Trk according to Flemings left hand rule. Hence, only the inner vertical parts (3d, 3d in FIG. 5) of the tracking coils 3c are effective for the tracking, and the horizontal parts and the outer vertical parts 3e of the tracking coils 3c do not contribute to tracking and are ineffective.

The elastic supporting members 5 are made of an elastic material and are fixed between the lens holder 2 and the mounting part 4 in parallel with each other. Each of the elastic supporting members 5 has a substantially rectangular end area 5a on the mounting part 4 side. The end areas 5a each have slits formed on both sides of a long, thin main portion extending in the front/rear direction of the respective elastic supporting member 5. A viscous substance is coated onto these end areas 5a so as to cover the main portions and the slits and is hardened. This viscous substance is for example an ultraviolet light hardening type viscous substance, and, after being coated, is hardened by being irradiated with ultraviolet light. As a result, the hardened viscous substance acts as a vibration-controlling damper and suppresses vibration of the elastic supporting members 5.

In the biaxial actuator 1 thus constructed, driving currents are supplied to the coils from outside and flux produced by the coils interacts with flux from the yoke 6 and the magnets 7 and the coil bobbin 3 is moved in the tracking direction Trk and the focusing direction Fcs. In this way, the objective lens 2a attached to the lens holder 2 is moved in the focusing direction and the tracking direction.

When the lens holder 2 is thus moved in the focusing direction and the tracking direction, the lens holder 2 tends to vibrate in the directions of its movement, but the vibration is suppressed by the damping action of the viscous substance provided on the rear ends of the elastic supporting members 5. In this way, the lens holder 2 is stopped in a stable state at a predetermined position.

The above-mentioned yoke 6 is substantially U-shaped in cross-section, and a Gap between the upper ends of the inner yoke 6a and the facing yoke 6b is open. To close off this open end of the yoke 6, a yoke bridge 6c is attached to the upper ends of the inner yoke 6a and the facing yoke 6b with an adhesive. The yoke bridge 6c thus increases the sensitivity of the magnetic circuit formed by the yoke 6 and the magnets 7a and 7b and prevents leakage of flux therefrom, and also acts as a stopper against movement of the coil bobbin 3 in the focusing direction.

When as shown in FIG. 2 two magnets 7a and 7b are attached to the inner surfaces of the inner yoke 6a and the facing yoke 6b of the above-mentioned yoke 6, a high flux density is obtained in the magnetic circuit formed by the magnets 7a and 7b and the yoke 6, but there has been the problem that because two magnets 7a and 7b are being used the overall biaxial actuator 1 is heavy. To overcome this problem it is possible to adopt a measure for which one of the magnets is eliminated.

For example, FIG. 3 shows a case wherein a magnet 7 is mounted on only the inner surface of the facing yoke 6b of the yoke 6.

With this arrangement, because only one magnet 7 is being used, the weight is reduced; however, points of action of the driving forces acting on the coils during focusing and tracking move away from the heavy objective lens 2a. Consequently, to keep these points of action usually around the center of gravity of the movable part, it is necessary to provide a balance such as a weight on the side opposite the objective lens and make the rear part of the movable part of the biaxial actuator 1 heavy. Because of this there has been the problem that the complicated work of mounting a balance is made necessary and furthermore the biaxial actuator 1 as a whole becomes heavy and large.

On the other hand, FIG. 4 shows a case wherein a magnet 7 is mounted on only the inner surface of the inner yoke 6a of the yoke 6. In this construction the weight decreases because only one magnet 7 is being used, and also the points of action of the driving force acting on the coils during focusing and tracking move toward the objective lens 2a. Therefore, to bring the center of gravity of the movable part to these points of action, it is only necessary to make the rear part of the movable part of the biaxial actuator 1 lighter and the whole actuator can thus be made smaller.

However, in a biaxial actuator 1 with the construction shown in FIG. 4, a current I flows in mutually opposite directions in the tracking coils 3c such as shown in FIG. 5. That is, in FIG. 5, a current flows clockwise in the tracking coil 3c on the left side and a current flows counterclockwise in the tracking coil 3c on the right side.

Therefore, the direction of the flux in the magnetic circuit of the yoke 6 and the magnet 7, such as shown in FIG. 6, is from the inner yoke 6a toward the facing yoke 6b and passes through the tracking coils 3c. As a result, because the currents in the inner vertical parts 3d of the tracking coils 3c extending vertically are flowing toward the rear of the paper surface, according to Fleming's left hand rule, driving forces F1 and F2 are respectively produced in the tracking direction as shown in FIG. 6.

In this case, because the width of the magnet 7 is larger than the distance between the centers of the tracking coils 3c, flux from around the both ends of this magnet 7 leaks toward the outer sides as shown by arrows toward outer side M1 and M2 and leakage flux is incident diagonally toward the outer side vertical parts 3e of the tracking coils 3c.

Because current flows through these outer side vertical parts 3e of the tracking coils 3c so as to come out from the paper surface, according to Fleming's left hand rule, driving forces F3, F4 are produced by leakage flux as shown in FIG. 6. Since the directions of these driving forces F3 and F4 are mutually different, as shown in FIG. 7, a moment M3 is produced by the driving forces F3 and F4 on the movable part of the biaxial actuator 1, i.e. the movable part made up of the objective lens 2a, the lens holder 2 and the coil bobbin 3, and consequently the lens holder 2 is turned. As a result, there has been the problem that it becomes impossible to carry out accurate tracking.

Also, in the biaxial actuator 1 thus constructed, because the yoke bridge 6c is attached to the open end of the yoke 6 with adhesive, there has been the problem that the adhesion strength is relatively low at about 300 to 500 g and furthermore, with respect to temperature changes, the strength decreases greatly with a temperature increase of about 35° C.

In view of the points described above it is an object of the invention to provide a biaxial actuator the whole of which is constructed to be small and light weighted and with which accurate tracking can be carried out and also preferably in which the attachment strength of a yoke bridge is improved.

SUMMARY OF THE INVENTION

It is, therefore, an object of the present invention to provide an objective lens driving device which resolves the above-mentioned problems.

According to the present invention, there is provided an objective lens driving device comprising a lens holder, an elastic supporting means, a coil bobbin and a yoke. An objective lens is mounted in the lens holder. The elastic supporting means has one end attached to the lens holder and the other end attached to a mounting part. The elastic supporting means support the lens holder movably in a direction parallel to the optical axis of the objective lens and in a plane perpendicular to the optical axis. A coil for focusing and coils for tracking are wound on the coil bobbin.

A magnet is mounted on the yoke, and the width of this magnet is selected so that flux from the magnet acts only on effective parts of the coils for tracking.

According to the present invention, there is also provided an objective lens driving device comprising a lens holder, an elastic supporting means, a coil bobbin and a yoke. An objective lens is mounted in the lens holder. The elastic supporting means has one end attached to the lens holder and the other end attached to a mounting part. The elastic supporting means support the lens holder movably in a direction parallel to the optical axis of the objective lens and in a plane perpendicular to the optical axis. A coil for focusing and coils for tracking are wound on the coil bobbin.

A yoke bridge which closes off an open end of the yoke is fixed to the yoke by soldering.

According to the present invention, by selecting the width of the magnet mounted on the yoke for driving the objective lens, flux from the magnet acts only on effective portions of the coils for tracking, the overall driving device can be made small and light weighted and accurate tracking can be carried out.

According to the construction described above, by the lens holder holding the objective lens being supported by the elastic supporting means, when a current is introduced into the coil for focusing or the coils for tracking, the lens holder moves to resist the tension of the elastic supporting means in a focusing direction or a tracking direction and focusing or tracking of the objective lens can be carried out.

Because, the width of the magnet is selected so that magnetic flux of this magnet acts only on effective parts of the coils for tracking, flux from the magnet acts only on the effective parts of the coils for tracking and according to Fleming's left hand rule a driving force in the tracking direction is produced by the currents flowing through these coil for tracking. Also, because the distance from both side edges of the magnet to the ineffective parts of the coils for tracking parallel to the effective parts thereof is relatively large, leakage flux from the magnet does not act on the current flowing through the above-mentioned ineffective parts.

When both side edges of the magnet are positioned between the outer side edges of the effective parts of the coils for tracking and the center thereof, because the distance from the side edges of the magnet to the ineffective parts of the coils for tracking parallel with the effective parts thereof is sufficiently large, no flux from this magnet acts on the ineffective parts.

When both side edges of the magnet are positioned at the outer side edges of the effective parts of the coils for tracking leakage flux from this magnet acting on the ineffective parts of the coils for tracking is completely eliminated and more accurate tracking can be carried out.

When the yoke bridge is soldered to end portions of the inner yoke and the facing yoke at both its ends, compared to conventional fixing with adhesive, a higher mounting strength can be obtained without decreasing the mounting strength due to temperature changes.

When the yoke and the yoke bridge are solder-plated, it is possible to carry out soldering of the yoke bridge to the yoke more certainly, the mounting strength of the yoke bridge to the yoke can be therefore increased further.

DETAILED DESCRIPTION OF THE PREFERRED EMBODIMENT

A preferred embodiment of the present invention will now be described in detail with reference to FIG. 8 through FIG. 13.

Because the embodiment described below is a preferable specific example of the present invention, various technically desirable limitations are attached thereto; however, the scope of the invention is not limited to this preferred embodiment.

Figure 1:
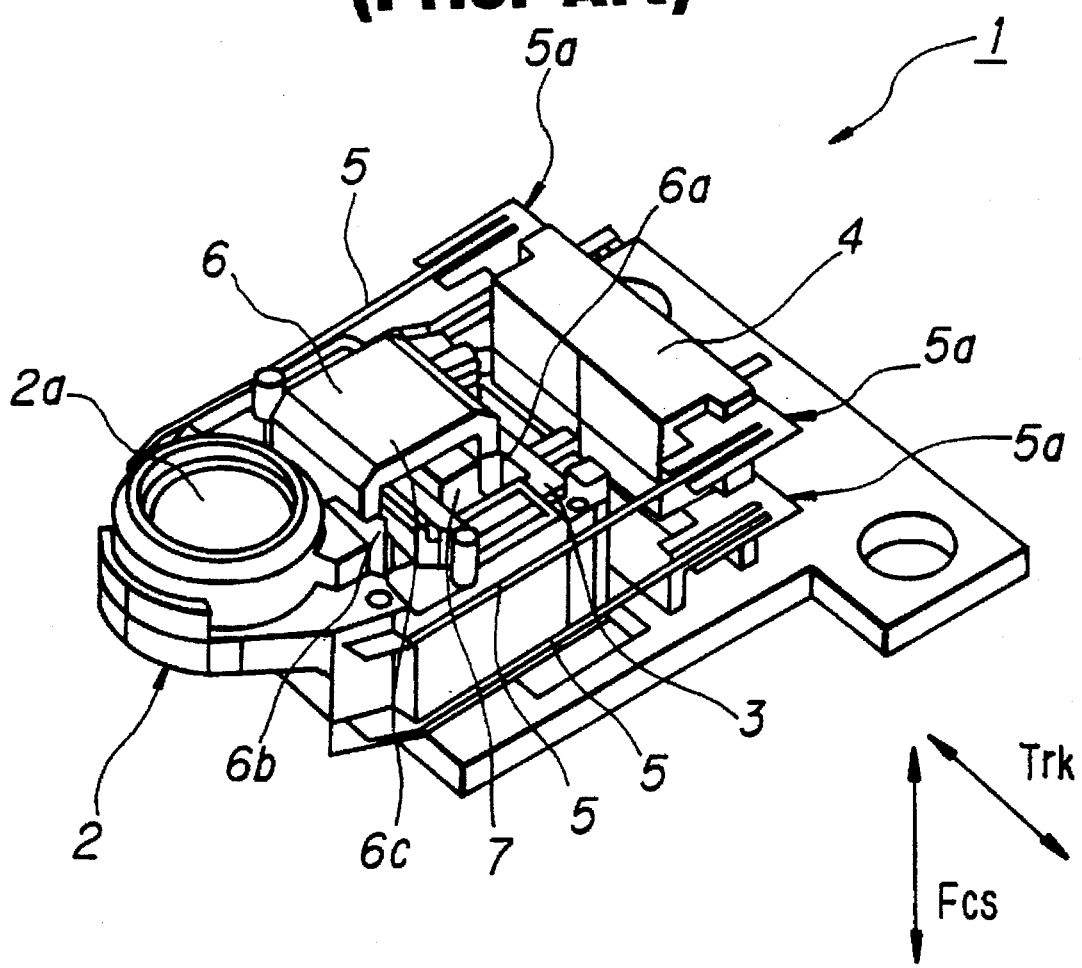
FIG. 1 is a schematic perspective view showing the overall construction of an example of a conventional biaxial actuator for an optical pickup.
Figure 2:
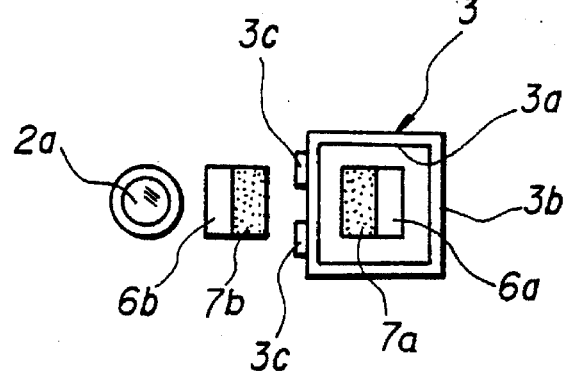
FIG. 2 is a schematic plan view showing an example of the disposition of a coil bobbin, a yoke and magnets in the biaxial actuator of FIG. 1.
Figure 3:
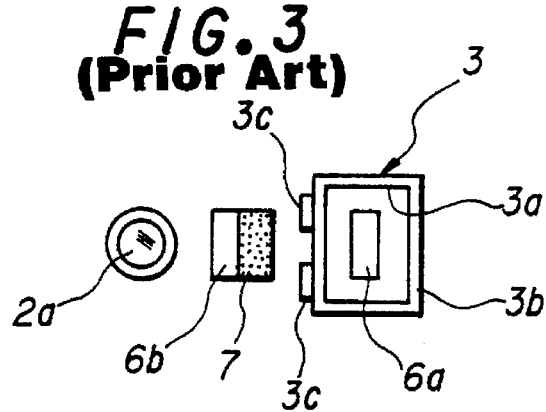
FIG. 3 is a schematic plan view showing another example of the disposition of a coil bobbin, a yoke and a magnet in the biaxial actuator of FIG. 1.
Figure 4:
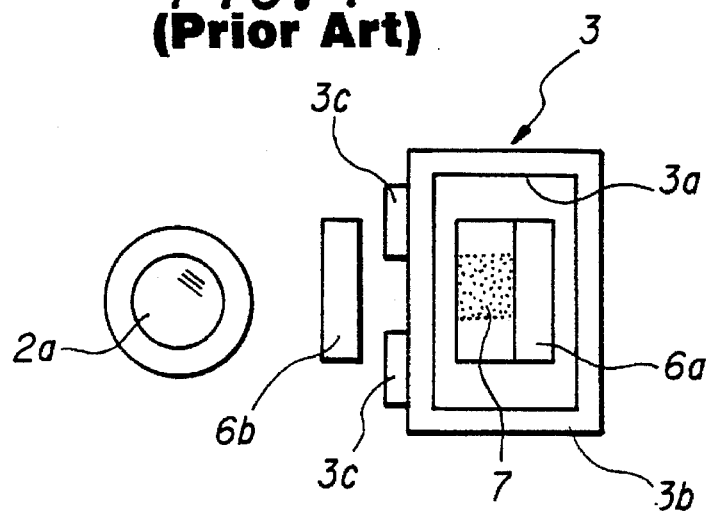
FIG. 4 is schematic plan view showing another example of the disposition of a coil bobbin, a yoke and a magnet in the biaxial actuator of FIG. 1.
Figure 5:
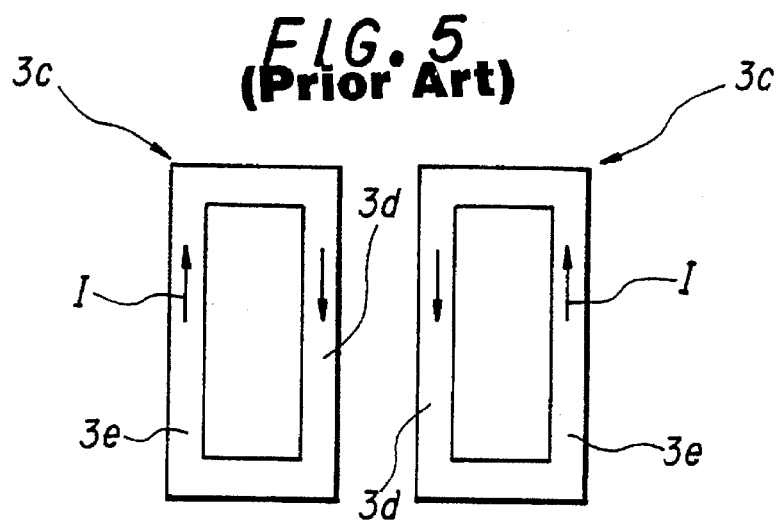
FIG. 5 is a schematic front view showing a relationship between the magnet and tracking coils of FIG. 4.
Figure 6:
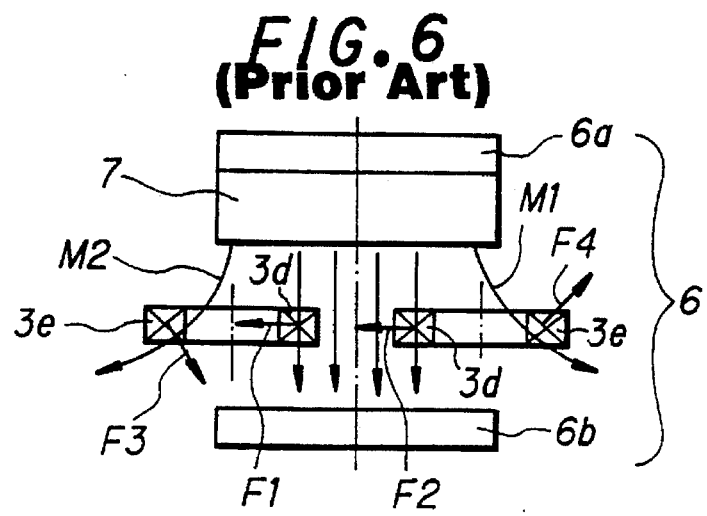
FIG. 6 is a schematic plan view showing a relationship between the magnet and the yoke and the tracking coils of FIG. 4.
Figure 7:
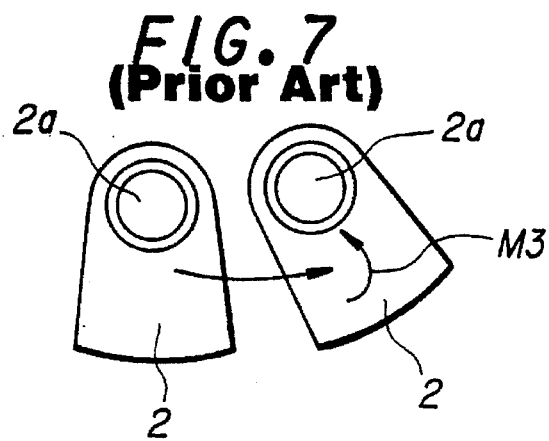
FIG. 7 is a schematic plan view showing movement of a movable part of the biaxial actuator with the magnet disposition of FIG. 4 during tracking.
Figure 8:
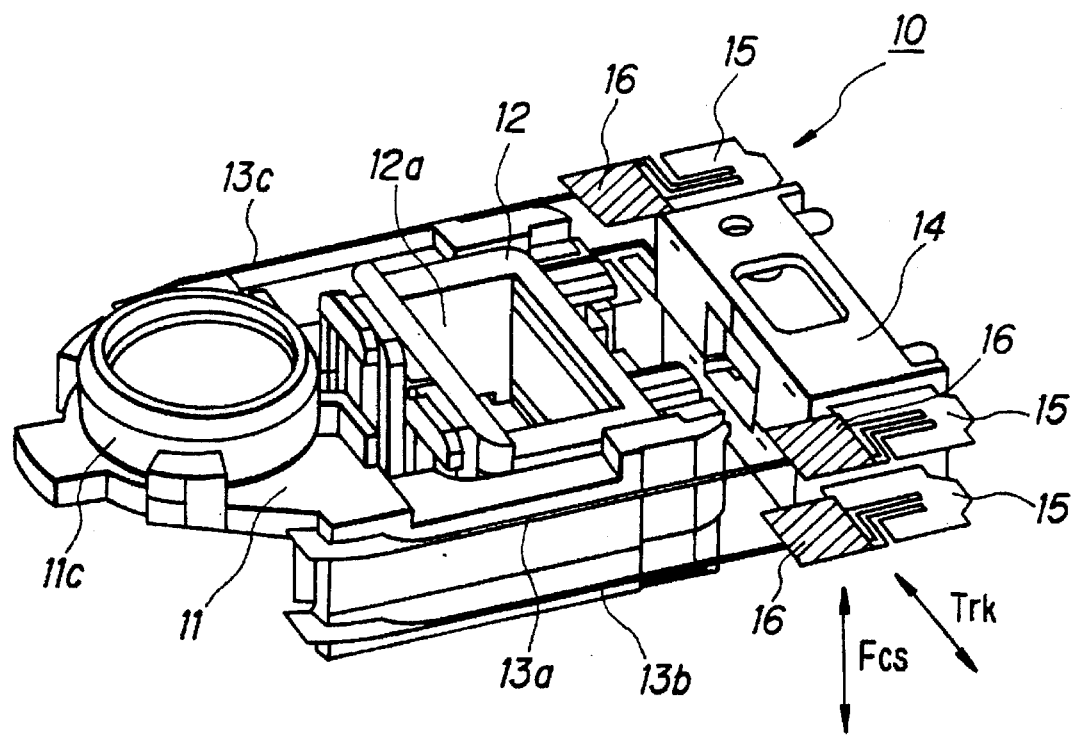
FIG. 8 is a schematic perspective view seen from the front showing the overall construction of an embodiment of a biaxial actuator for an optical pickup according to the present invention.
Figure 9:
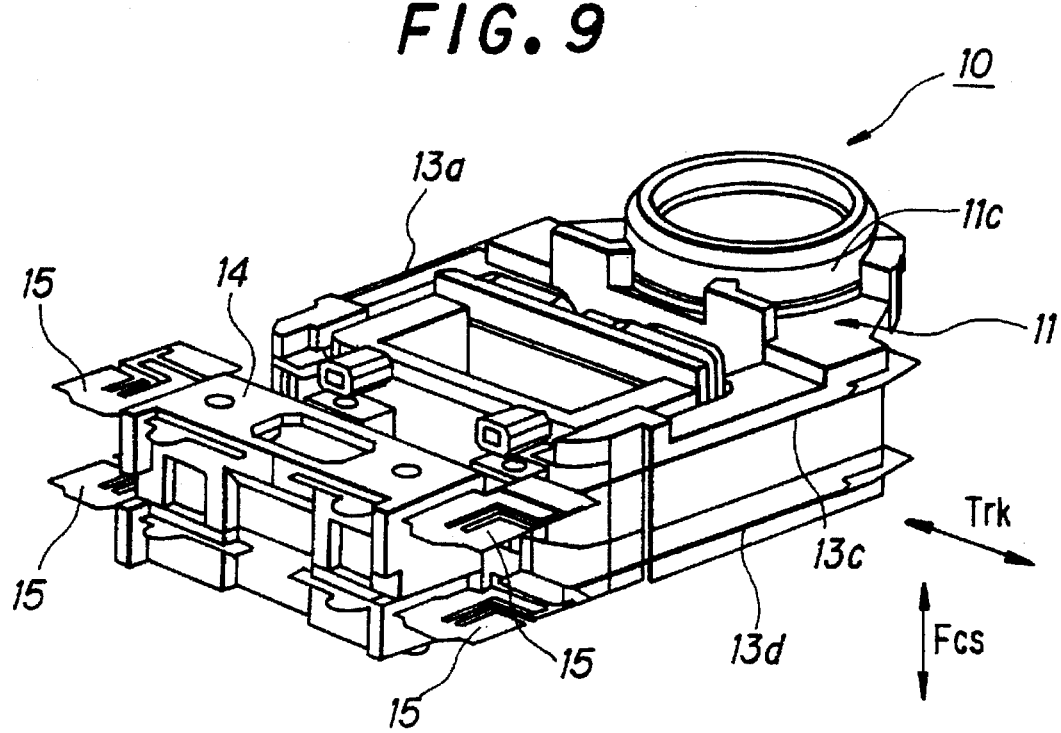
FIG. 9 is a schematic perspective view seen from the rear showing the biaxial actuator of FIG. 8.
Figure 10:
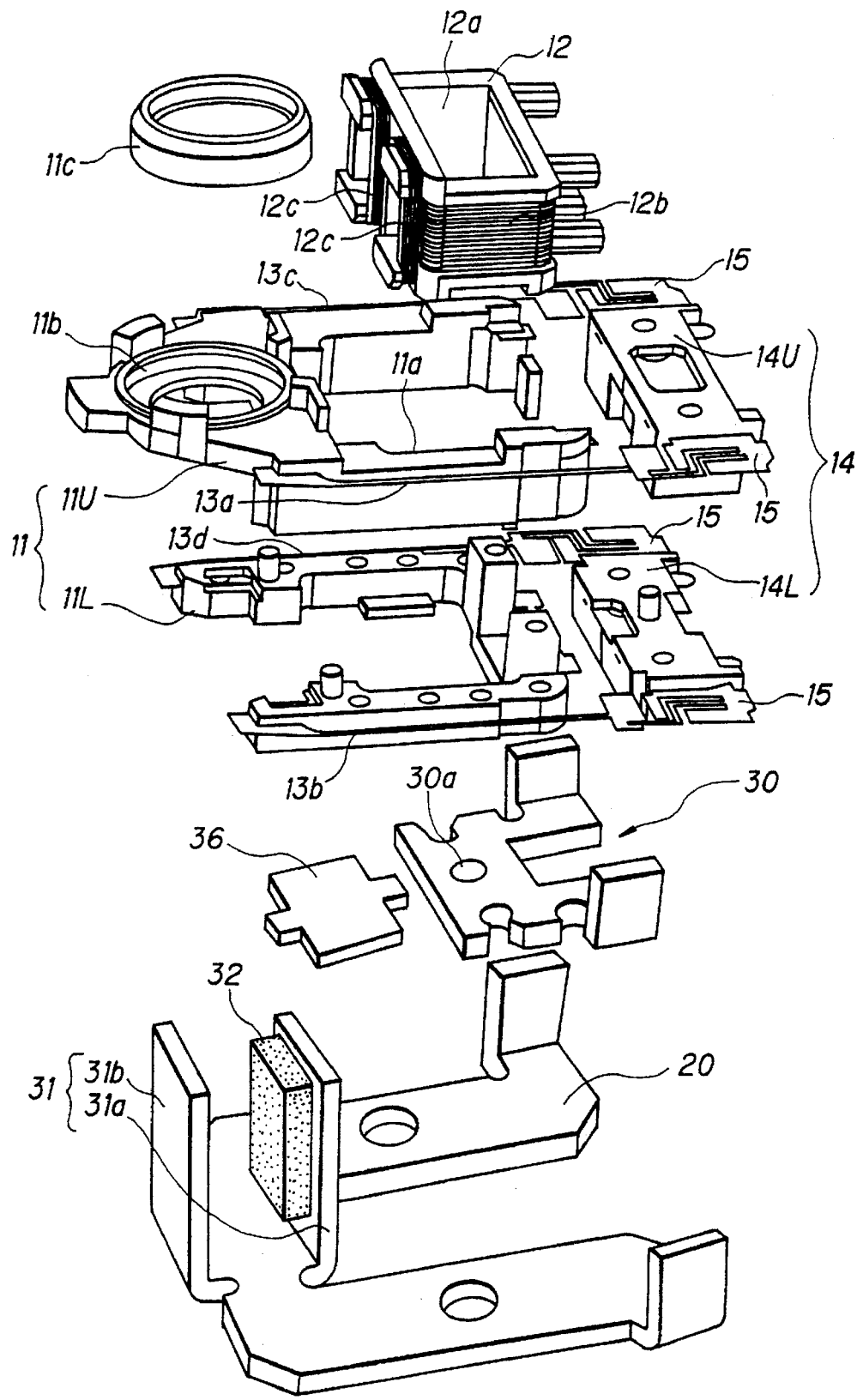
FIG. 10 is an exploded perspective view showing the biaxial actuator and a yoke of FIG. 8.
Figure 11:
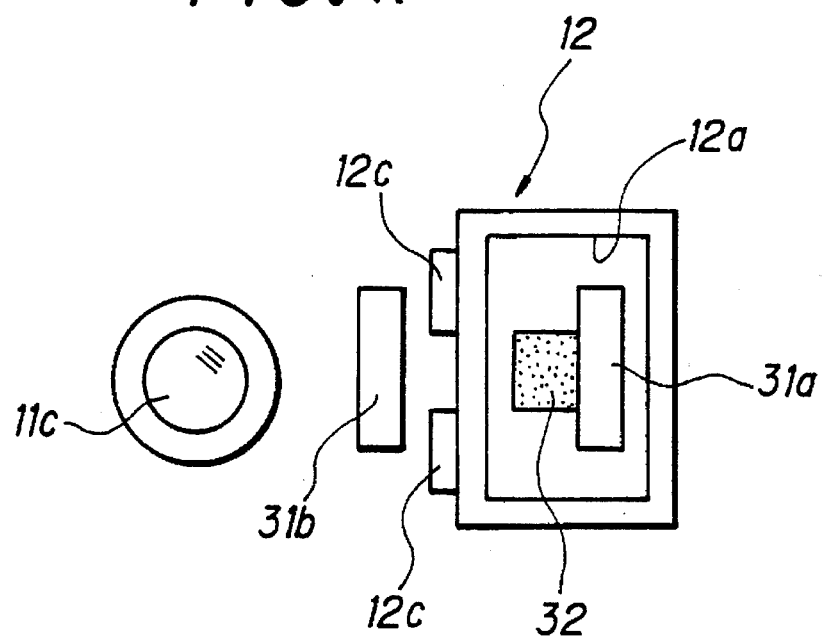
FIG. 11 is a schematic plan view showing the disposition of a coil bobbin, a yoke and a magnet in the biaxial actuator of FIG. 8.

FIG. 8 through FIG. 10 show the construction of an embodiment of a biaxial actuator according to the present invention. In FIG. 8 through FIG. 10, a biaxial actuator 10 includes a lens holder 11, a coil bobbin 12, a plurality of elastic supporting members 13a, 13b, 13c and 13d as an elastic supporting means, a mounting part 14, a base 20 and a yoke 31.

The lens holder 11, as shown in FIG. 10, is split along a horizontal split line into an upper part 11U and a lower part 11L, and these two parts are fixed to each other with an adhesive. Also, as shown in FIG. 10, an opening 11a in which the coil bobbin 12 is mounted and a recess 11b in which an objective lens 11c is mounted are formed in the lens holder 11.

In the bottom of this recess 11b, a hole is formed through which passes a light beam emitted from a semiconductor laser or a returning light beam from the signal recording surface of an optical disc. The objective lens 11c is mounted in the recess 11b of the lens holder 11.

The lens holder 11 is movably supported on the mounting part 14 in a focusing direction Fcs and in a tracking direction Trk by the elastic supporting members 13a, 13b, 13c and 13d.

The coil bobbin 12 has an opening 12a formed therein into which is inserted a magnetic circuit made up of the yoke 31 formed integrally with the base 20 and a magnet 32 mounted on the inner surface of an inner yoke 31a of the yoke 31 and is provided with a coil for focusing 12b and coils for tracking 12c.

The coil for focusing 12b is wound along an axis in parallel with the optical axis of the objective lens 11c. The coils for tracking 12c are formed by winding coils elliptically or rectangularly and are mounted on one side surface of the coil for focusing 12b. This coil bobbin 12 is mounted in the opening 11a formed in the lens holder 11 with the coil for focusing 12b and the coils for tracking 12c being mounted thereon. After the coil bobbin 12 is mounted in the lens holder 11, the upper surface of the coil bobbin 12 is covered by a yoke bridge 36. This yoke bridge 36 forms a closed magnetic circuit together with the yoke 31 of the above-mentioned magnetic circuit and improves sensitivity and prevents the leakage of flux from the magnetic circuit. Also, the yoke bridge 36 functions as a stopper of the lens holder 11.

The elastic supporting members 13a, 13b, 13c and 13d preferably are conductive and elastic, and a material such as phosphor bronze, beryllium copper, titanium copper, tin-nickel alloy or stainless steel is used. In this embodiment, the elastic supporting members 13a, 13b, 13c and 13d are formed from thin sheet metal as, for example, sheet spring suspensions and fixed between the lens holder 11 and the mounting part 14 so that they are in parallel.

In this way, the elastic supporting members 13a, 13b, 13c and 13d may be used to supply driving currents from external current supply means to the coil for focusing 12b and the coils for tracking 12c wound on the coil bobbin 12.

Also, a viscous substance 16 acting as a damper is coated onto end areas 15 of the elastic supporting members 13a, 13b, 13c and 13d and hardened.

With the lens holder 11 and the mounting part 14 being linked by the four elastic supporting members 13a, 13b, 13c and 13d, the mounting part 14 is mounted on an adjusting plate 30. This adjusting plate 30 is for adjusting the fixed position of the mounting part 14 when the biaxial actuator is being assembled. The adjusting plate 30 is fixed by soldering to the base 20 formed integrally with the yoke 31.

This mounting of the mounting part 14 on the adjusting plate 30 is carried out by inserting a boss provided on the mounting part 14 into a hole 30a in the adjusting plate 30 and fixing it with adhesive or the like.

A pair of yokes 31 (31a, 31b) are provided on the base 20 by bending end portions of the base 20 on the objective lens side upward. That is, the inner yoke 31a and a facing yoke 31b are formed integrally with the base 20 by press working or the like and the magnet 32 is mounted on the inner side surface of the inner yoke 31a. As a result, a magnetic circuit is formed by the pair of yokes 31a, 31b and the magnet 32.

When the mounting part 14 is mounted on the base 20 as described above, the coil for focusing 12b and the coils for tracking 12c mounted on the coil bobbin 12 are inserted into a gap between the magnet 32 and the facing yoke 31b. At the same time, the inner yoke 31a and the magnet 32 are inserted into the opening 12a of the coil bobbin 12.

Figure 12:
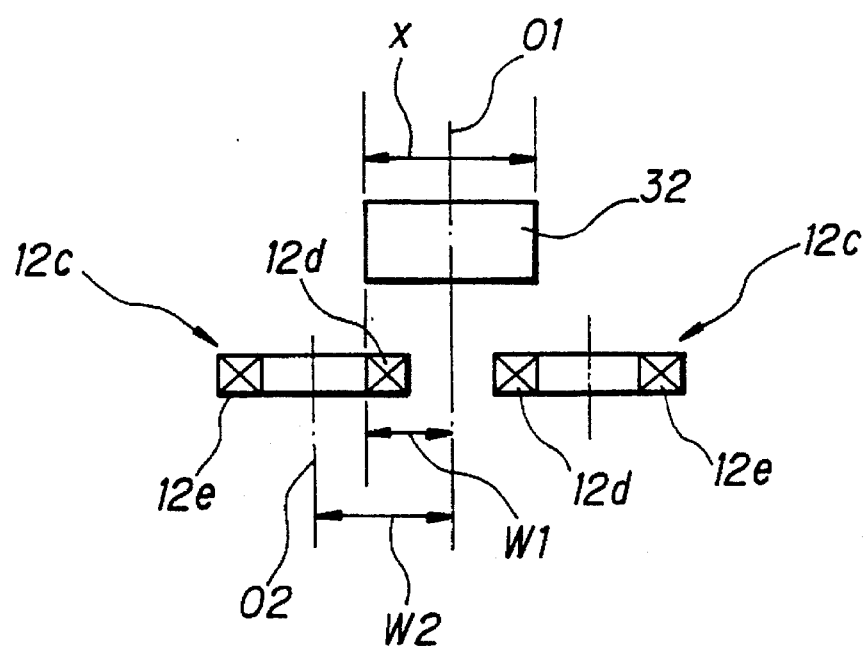
FIG. 12 is a schematic plan view showing a relationship between the magnet of FIG. 11 and coils for tracking.

Also, as shown in FIG. 12, in the biaxial actuator 10, the one magnet 32 mounted on only the inner surface of the inner yoke 31a is disposed with its centerline 01 being arranged at the center between the two coils for tracking 12c. Furthermore, the width x of the magnet 32 is selected so that both side edges thereof are positioned between W1, a distance from the centerline 01 to the outer edges of the inner side vertical effective parts 12d of the coils for tracking 12c, and W2, a distance from the centerline 01 to the centerlines 02 of the coils for tracking 12c.

As a result, as will be further discussed later, in the biaxial actuator 10 of this embodiment, during tracking operation, leakage flux of the magnet 32 does not act on the ineffective parts, i.e. the parts 12e, of the coils for tracking 12c without causing unstable action.

In particular, preferably, the width of the magnet 32 is selected so that both side edges thereof are substantially at the distance W1 from the centerline 01 to the outer edges of the inner side vertical effective parts 12d of the coils for tracking 12c.

Figure 13:
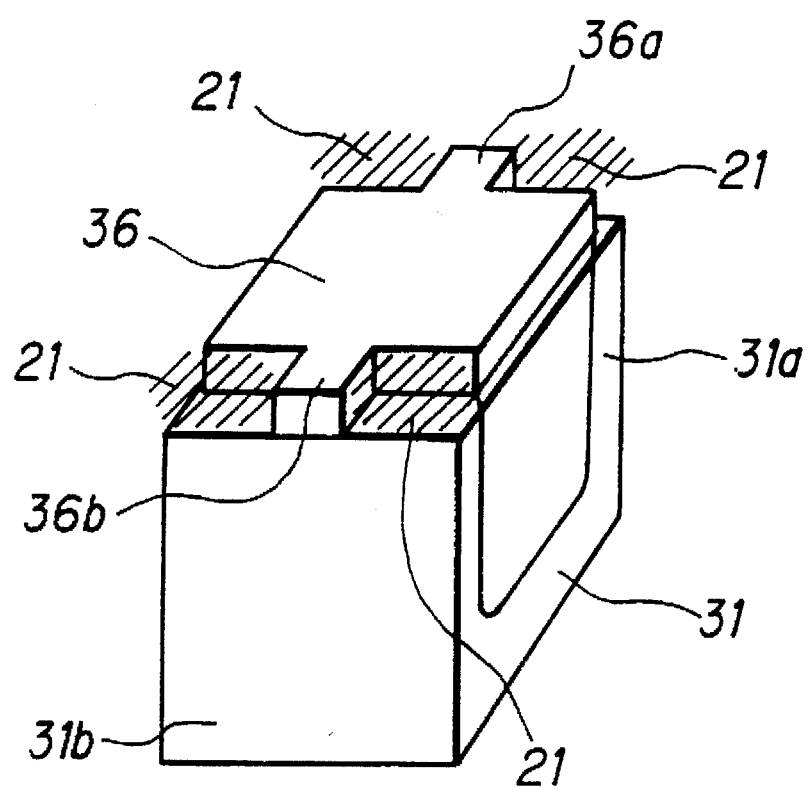
FIG. 13 is an enlarged perspective view showing a yoke and a yoke bridge in the biaxial actuator of FIG. 8.

Also, the parts of the yoke bridge 36 which abut with the upper ends of the inner yoke 31a and the facing yoke 31b are formed as narrow projecting parts 36a and 36b, as shown in FIG. 13. With solders being piled on both sides of each of these projecting parts 36a and 36b, this yoke bridge 36 is attached to the base 20 by soldering.

In the biaxial actuator 10 of this embodiment, currents based on a focusing servo signal and a tracking servo signal are respectively supplied to the coil for focusing 12b and the coils for tracking 12c wound on the coil bobbin 12. In this way, by a direct current field of the magnetic circuit and alternating fields arising from the coil for focusing 12b and the coils for tracking 12c, the lens holder 11, that is, the objective lens 11c, is driven in the focusing direction Fcs and the tracking direction Trk.

Because the viscous substance 16 is coated onto the end areas 15 of the elastic supporting members 13a, 13b, 13c and 13d on the mounting part 14 side and hardened, a desired damping characteristic can be obtained. As a result, for example during focusing or tracking, vibration of the elastic supporting members 13a, 13b, 13c and 13d is damped by the viscous substance 16.

The width x of the magnet 32 is selected as described above so that the side edges of the magnet 32 are between W1 and W2 for preventing leakage flux from both side edges of the magnet 32 from acting on the outer side ineffective parts 12e of the coils for tracking 12c wound on the coil bobbin 12. Therefore, because driving forces created by flowing current and flux from the magnet 32 are not exerted on these ineffective parts 12e, no moment is exerted on the movable part of the biaxial actuator 10. As a result, it becomes possible for accurate tracking to be carried out.

Also, because the yoke bridge 36 is soldered to the yoke 31, the mounting strength thereof, compared to a conventional adhesion case, is greatly increased by about 1000 g and strength decrease due to temperature change is reduced to about 5%. Therefore, the mounting strength and the strength decrease due to temperature change are markedly improved. The soldered parts of the yoke bridge 36 and the yoke 31 being solder-plated in advance are able to further increased the mounting strength, because soldering can be carried out easily and certainly.

In this way, in this embodiment, because the width of the magnet 32 is selected so that flux of this magnet 32 acts only on the effective parts of the tracking coils 12c, flux from the magnet 32 acts only on the effective parts 12d of the tracking coils 12c and currents flowing through these tracking coils 12c produce a driving force in the tracking direction according to Fleming's left hand rule. Also, because the distance from both side edges of the magnet 32 to the ineffective parts 12e of the tracking coils 12c, which are parallel to the effective parts 12d thereof, is relatively large, leakage flux from the magnet 32 does not act on the current flowing through these ineffective parts. Therefore, a moment is not exerted on the movable part of the biaxial actuator 10 and accurate tracking can be carried out.

When the yoke 31 and the yoke bridge 36 are solder-plated in advance, because soldering of the yoke bridge 36 to the yoke 31 can be carried out more certainly, the mounting strength of the yoke bridge 36 to the yoke 31 can be increased further.

In the preferred embodiment described above, the elastic supporting members 13a, 13b, 13c and 13d are explained as being simply fixed to the lens holder 11 and the mounting part 14, but they may alternatively be formed integrally with the lens holder 11 and the mounting part 14 by insert molding or the like. Also, although the lens holder 11 is split into the upper part 11U and the lower part 11L in the preferred embodiment described above, the lens holder 11 may alternatively be formed integrally as a single unit.

What is claimed is:

1. An objective lens driving device comprising:
    a lens holder for holding an objective lens;
    an elastic supporting means having one end attached to the lens holder and the other end attached to a mounting part for elastically supporting the lens holder on the mounting part;
    a coil bobbin mounted on the lens holder;
    a focusing coil wound on the coil bobbin;
    tracking coils wound on the coil bobbin and disposed along a line in a tracking direction;
    a yoke comprising an inner yoke and a facing yoke respectively disposed on an inner side and an outer side of the coil bobbin with the focusing coil and the tracking coils therebetween; and
    a magnet mounted on an inner side surface of the inner yoke, the magnet having a width being selected so that flux of the magnet acts only on effective parts of the tracking coils.

2. An objective lens driving device according to claim 1 wherein:
    both side edges of the magnet are positioned between outer side edges of the effective parts and respective centers of the two tracking coils disposed.

3. An objective lens driving device according to claim 1 wherein:
    both side edges of the magnet are positioned at outer side edges of the effective parts of the two tracking coils.

4. An objective lens driving device according to claim 1 wherein:

the elastic supporting means comprises a plurality of elastic supporting members each being conductive and elastic.

5. The objective lens driving device as set forth in claim 1, further comprising an adjusting plate for mounting the mounting part to a base.

6. The objective lens driving device as set forth in claim 5, wherein said yoke is mounted on said base.

7. The objective lens driving device as set forth in claim 1, wherein the width of said magnet is dimensioned so that the flux of the magnet does not act upon ineffective parts of the tracking coils and wherein the ineffective parts are parallel to the effective parts of the tracking coils.

8. The objective lens driving device as set forth in claim 7, wherein the effective parts of the tracking coils comprise inner vertical parts of the tracking coils and the ineffective parts of the tracking coils comprise outer vertical parts of the tracking coils.

9. The objective lens driving device as set forth in claim 1, further comprising a yoke bridge for connecting the inner yoke to the facing yoke.

10. An objective lens driving device comprising:

a lens holder for holding an objective lens;

an elastic supporting means having one end attached to the lens holder and the other end attached to a mounting part for elastically supporting the lens holder on the mounting part;

a coil bobbin mounted on the lens holder;

a focusing coil wound on the coil bobbin;

tracking coils wound on the coil bobbin and disposed along a line in a tracking direction;

a yoke comprising an inner yoke and a facing yoke respectively disposed on an inner side and an outer side of the coil bobbin with the focusing coil and the tracking coils therebetween, the yoke having an open end for insertion of the coil bobbin;

a magnet mounted on an inner side surface of the inner yoke, the magnet having a width being selected so that flux of the magnet acts only on effective parts of the tracking coils; and a yoke bridge for closing off the open end of the yoke, the yoke bridge having ends for being soldered to ends of the inner yoke and the facing yoke.

11. An objective lens driving device according to claim 10 wherein:

at least one of the yoke and the yoke bridge is solder-plated.

12. An objective lens driving device according to claim 10 wherein:

both side edges of the magnet are positioned between outer side edges of the effective parts and respective centers of the two tracking coils.

13. An objective lens driving device according to claim 10 wherein:

both side edges of the magnet are positioned at outer side edges of the effective parts of the two tracking coils.

14. An objective lens driving device according to claim 10 wherein:

the elastic supporting means comprises a plurality of elastic supporting members each being conductive and elastic.

15. The objective lens driving device as set forth in claim 10, wherein both the yoke and the yoke bridge are solder-plated.

* * * * *